Feb. 1, 1955     G. D. WILLITS ET AL     2,701,316
SLOT LINER-CLOSER FOR DYNAMOELECTRIC MACHINES
Filed Sept. 3, 1952
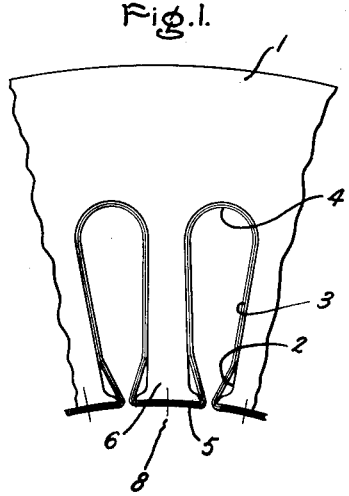
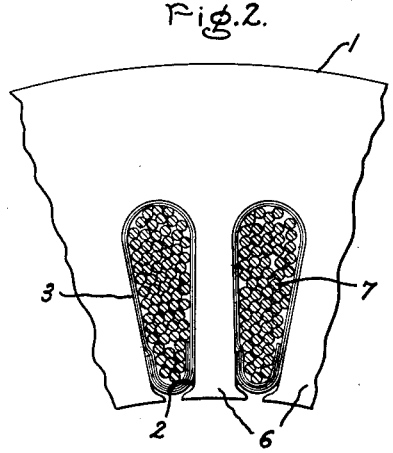
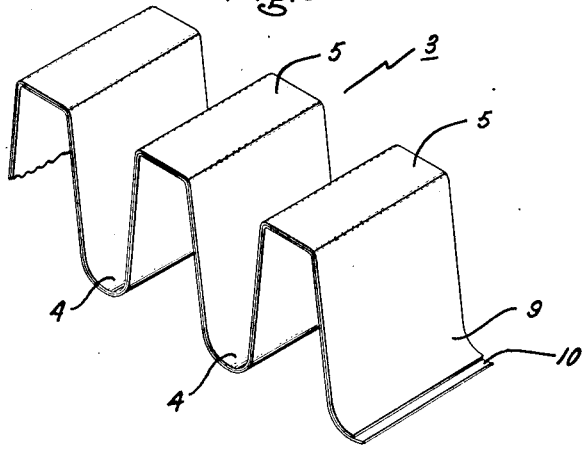
Inventors:
Glenn D. Willits,
Clairmont J. Herman,
by Robert G. Irish
Their Attorney.

United States Patent Office

2,701,316
Patented Feb. 1, 1955

2,701,316

SLOT LINER-CLOSER FOR DYNAMOELECTRIC MACHINES

Glenn D. Willits, Leo, and Clairmont J. Herman, Fort Wayne, Ind., assignors to General Electric Company, a corporation of New York Application September 3, 1952, Serial No. 307,624

7 Claims. (Cl. 310—214)

This invention relates to dynamoelectric machines and more particularly to stator members therefor.

The stator members of small dynamoelectric machines conventionally comprise a core member formed of a plurality of relatively thin laminations of magnetic material and having a plurality of radially extending winding slots formed in its inner periphery or bore. The windings of the machine are positioned in these slots and in order to insulate the windings from the core, slot insulators are arranged in the slots with the windings being positioned thereover. Slot wedges are ordinarily inserted in each slot over the winding to hold the windings in place thus completing the assembly.

In the past, each slot insulator has been separately preformed and individually inserted in a slot with a cuff being provided on each end to hold the insulator in position during the winding operation. The forming and insertion of these individual slot insulators has added appreciably to the cost of the machine and it is therefore desirable to provide a means of slot insulation wherein the insulator in each slot need not be separately formed and inserted. It is further desirable that such an insulation system eliminate the necessity for cuffs on the edge of the slot insulation and the use of slot wedges.

An object of this invention is, therefore, to provide an improved stator construction for dynamoelectric machines incorporating an improved system of slot insulation.

Further objects and advantages will become apparent and the invention will be better understood by reference to the following description and the accompanying drawing, and the features of novelty which characterize this invention will be pointed out with particularity in the claims annexed to and forming a part of this specification.

This invention in its broadest aspects provides a stator core member having a plurality of winding slots formed therein with slot insulators being respectively arranged in each of said slots. Each of the insulators is formed from a strip having a plurality of preformed insulator segments, this strip being in turn formed of a plurality of separate relatively thin sheets of insulation material. Windings are arranged in the slots over the insulators. More specifically, after the insulators are positioned in the slots and the windings wound therein, the portions of the strip connecting adjacent insulators are axially cut and the resultant ends of each insulator are folded over the associated winding forming a slot wedge. The strip containing the insulator segments may be formed of two or more thin sheets of synthetic insulating material thus providing sufficient flexibility to permit folding of the ends into the slots over the windings while still providing a sufficient thickness of insulation. Both sheets may be formed of the same material, for example polyethylene glycol terythalate or one sheet may be formed of one synthetic material such as polyethylene glycol terythalate and the other sheet formed of another synthetic material such as polytetrafluoroethylene or monochlorotrifluoroethylene.

In the drawing, Fig. 1 is a fragmentary side elevational view showing a dynamoelectric machine stator core with the connected insulators arranged in the slots thereof prior to winding;

Fig. 2 shows the core of Fig. 1 with the windings arranged in the slots and with the connecting portions between the insulators cut and the resultant ends folded into the slots over the windings; and Fig. 3 illustrates the strip of insulation having preformed insulator segments utilized in this invention.

Referring now to the drawing, there is shown a stator core member 1, preferably formed of a plurality of relatively thin laminations of magnetic material, having a plurality of winding slots 2 formed in its inner periphery or bore. In order to insulate the slots 2, a preformed strip 3 is provided having slot insulator segments 4 formed therein connected by connecting portions 5. The strip 3 is arranged with the slot insulator portions 4 in the slots 2 and with the connecting portions 5 passing over the teeth 6 of core 1. Suitable windings 7 are then arranged in the slots over the slot insulator segments 4 and the connecting portions 5 of the strip 3 are then respectively cut, as at 8 in Fig. 1 and resultant ends folded into the slots 2 over the windings 7 as clearly shown in Fig. 2.

In order to provide sufficient flexibility to permit folding the ends of the slot insulator segments 4 into the slots over the windings, strip 3 is formed of a plurality of separate layers of thin insulation, shown in Fig. 3 as layers 9 and 10. These layers or sheets of insulation material are not cemented or joined together in any way and when the connecting portions 5 are slit and folded over the windings in the slots thus forming slot wedges, the ends stay in place due to the relative limpness of the thin material forming sheets 9 and 10. A plurality of thin sheets, for example 2, is necessary rather than one thick sheet since the rigidity and spring-back characteristics of synthetic sheet insulation increase approximately as the fourth power of thickness. Thus, a strip 3 formed of a single thickness, for example, .005", of insulation material is found too springy to stay in place when slit and folded over inside the tops of the winding slots to form wedges. However, two separate thicknesses, for example .002" each, are individually sufficiently limp to readily permit folding into the slots and their combined thicknesses provide ample insulation, whereas a single thickness of .002" would be too thin for adequate insulation.

It has been found that materials such as polyethylene glycol terythalate or polytetrafluoroethylene are suitable for sheets 9 and 10 of strip 3. It has also been found that different materials may be used together, for example, the inner layer 10 may be formed of polyethylene glycol terythalate which is a relatively tough material while the outer layer 9 may be formed of polytetrafluoroethylene or monochlorotrifluoroethylene which has outstanding chemical inertness and heat resistance thus adding important insulation qualities.

It is thus seen that this invention provides an improved insulation system for small dynamoelectric machines which reduces the cost and provides improved insulation. The strip 3 is much easier to install than the individual slot insulators formerly used and the folding back of the cut ends, as shown in Fig. 2, eliminates the need for slot wedges. Furthermore, in addition to permitting the utilization of a continuous strip 3, it has been found that the provision of two or more separate layers of thin insulation material which are thus free to slide with respect to each other will not cut through at the sharp edges of the stator slots as easily as an equivalent single thickness of material. The use of this insulation system provides the maximum possible economy in the usage of insulation material since the elimination of cuffs on the outer edges saves an appreciable amount of material. A minimum thickness of material may be used for each sheet because there is no requirement for spring-back in slots. In addition, less material is needed to seal or wedge the windings in the slots than is required for conventional slot wedges. Since this construction permits the use of very thin insulation materials, the space available for windings is thereby increased. An additional desirable feature is the fact that the insulation covers the sharp corners of the stator core teeth during the winding operation thereby preventing the skinning of the insulation from the wire during the winding operation. Furthermore, since the slot insulator segments are connected together during winding, they are held in place and will not be shifted from the desired position during winding.

While we have shown and described a particular embodiment of this invention, further modifications and improvements will occur to those skilled in the art. We desire that it be understood, therefore, that this invention is not limited to the form shown and we intend in the appended claims to cover all modifications which do not depart from the spirit and scope of this invention.

What we claim as new and desire to secure by Letters Patent of the United States is:

1. A stator construction for a dynamoelectric machine comprising a core member having a plurality of winding slots formed therein, slot insulators respectively arranged in each of said slots, each of said insulators being formed from a strip having a plurality of connected preformed insulator segments, said strip being formed of a plurality of relatively thin sheets of insulation material, said sheets being maintained separate from each other whereby each of said sheets is adapted to flex independently, and windings arranged in said slots over said insulators.

2. A stator construction for a dynamoelectric machine comprising a core member having a plurality of winding slots formed therein, slot insulators respectively arranged in each of said slots, each of said insulators being formed from a strip having a plurality of connected preformed insulator segments, said strip being formed of two relatively thin sheets of insulation material, said sheets being maintained separate from each other whereby each of said sheets is adapted to flex independently of the other of said sheets, and windings arranged in said slots over said insulators.

3. A stator construction for a dynamoelectric machine comprising a core member having a plurality of winding slots formed therein, slot insulators respectively arranged in each of said slots, each of said insulators being formed from a strip having a plurality of connected preformed insulator segments, said strip being formed of a plurality of relatively thin sheets of insulation material, said sheets being maintained separate from each other whereby each of said sheets is adapted to flex independently, and windings arranged in said slots over said insulators, the ends of each of said insulators being respectively folded into said slots and over said windings thereby forming slot wedges.

4. A stator construction for a dynamoelectric machine comprising a core member having a plurality of winding slots formed therein, slot insulators respectively arranged in each of said slots, each of said insulators being formed from a strip having a plurality of connected preformed insulator segments, said strip being formed of a plurality of relatively thin sheets of synthetic insulation material, said sheets being maintained separate from each other whereby each of said sheets is adapted to flex independently, and windings arranged in said slots over said insulators, the ends of each of said insulators being respectively folded into said slots and over said windings thereby forming slot wedges.

5. A stator construction for a dynamoelectric machine comprising a core member having a plurality of winding slots formed therein, slot insulators respectively arranged in each of said slots, each of said insulators being formed from a strip having a plurality of connected preformed insulator segments, said strip being formed of a plurality of relatively thin sheets of polyethylene glycol terythalate, said sheets being maintained separate from each other whereby each of said sheets is adapted to flex independently, and windings arranged in said slots over said insulators.

6. A stator construction for a dynamoelectric machine comprising a core member having a plurality of winding slots formed therein, slot insulators respectively arranged in each of said slots, each of said insulators being formed from a strip having a plurality of connected preformed insulator segments, said strip being formed of a plurality of relatively thin sheets of synthetic insulation material, said sheets being maintained separate from each other whereby each of said sheets is adapted to flex independently, at least one of said sheets being formed of polytetrafluoroethylene and at least one other of said sheets being formed of polyethylene glycol terythalate, and windings arranged in said slots over said insulators.

7. A stator construction for a dynamoelectric machine comprising a core member having a plurality of winding slots formed therein, slot insulators respectively arranged in each of said slots, each of said insulators being formed from a strip having a plurality of connected preformed insulator segments, said strip being formed of a plurality of relatively thin sheets of synthetic insulation material, said sheets being maintained separate from each other whereby each of said sheets is adapted to flex independently, at least one of said sheets being formed of monochlorotrifluoroethylene and at least one other of said sheets being formed of polyethylene glycol terythalate, and windings arranged in said slots over said insulators.

References Cited in the file of this patent

UNITED STATES PATENTS

| Number | Name | Date |
|---|---|---|
| 563,379 | Jefferson | July 7, 1896 |
| 1,564,449 | Sayre | Dec. 8, 1925 |
| 1,619,415 | Gomory | Mar. 1, 1927 |
| 1,913,333 | Eaton | June 6, 1933 |
| 2,320,866 | Hill | June 1, 1943 |
| 2,400,099 | Brubaker | May 14, 1946 |
| 2,556,295 | Pace | June 12, 1951 |